(12) United States Patent
Roesch

(10) Patent No.: US 6,768,929 B2
(45) Date of Patent: Jul. 27, 2004

(54) METHOD AND INSTALLATION FOR STORING AND DELIVERING OBJECTS

(75) Inventor: Andreas Roesch, Frauenfeld (CH)

(73) Assignee: Denipro AG, Weinfelden (CH)

( * ) Notice: Subject to any disclaimer, the term of this patent is extended or adjusted under 35 U.S.C. 154(b) by 266 days.

(21) Appl. No.: 10/036,290

(22) Filed: Nov. 7, 2001

(65) Prior Publication Data

US 2002/0070093 A1 Jun. 13, 2002

(30) Foreign Application Priority Data

Nov. 8, 2000 (CH) .............................................. 2175/00

(51) Int. Cl.[7] .............................. B65G 1/00; B65G 37/00

(52) U.S. Cl. .................... 700/214; 198/347.4; 198/523; 198/700

(58) Field of Search ........................... 198/347.1, 347.4, 198/347.2, 434, 436, 437, 523, 530, 540, 541, 700; 700/214, 213, 215, 216, 225, 226; 414/13, 222.02, 222.03, 226.01, 226.03

(56) References Cited

U.S. PATENT DOCUMENTS

| | | | |
|---|---|---|---|
| 3,690,478 A | * | 9/1972 | Brummett et al. .......... 198/367 |
| 4,773,807 A | * | 9/1988 | Kroll et al. ................. 414/282 |
| 4,811,551 A | | 3/1989 | Nambu |
| 4,917,228 A | * | 4/1990 | Ichihashi et al. ........ 198/347.4 |
| 4,977,996 A | * | 12/1990 | Duce ..................... 198/349.95 |

(List continued on next page.)

FOREIGN PATENT DOCUMENTS

| | | | | |
|---|---|---|---|---|
| EP | EP 0 903 308 A1 | | 3/1999 | |
| JP | JP-55-35744 A | * | 3/1980 | ........... B65G/47/57 |
| JP | JP-57-13023 A | * | 1/1982 | ........... B65G/47/48 |
| WO | WO-91/10610 A1 | * | 7/1991 | ........... B65G/47/61 |

OTHER PUBLICATIONS

WO 86/00062, Sorting and Waiting Storage System for Perishable Goods Coming from Production for Delivery and Packed in Transport Boxes, Publication Date: Jan. 3, 1986.
WO 99/33731, Conveyor System, Publication Date: Jul. 8, 1999.

(List continued on next page.)

Primary Examiner—Donald P. Walsh
Assistant Examiner—Mark J. Beauchaine
(74) Attorney, Agent, or Firm—Rankin, Hill, Porter & Clark LLP

(57) ABSTRACT

An installation for temporary storage and ready for dispatch delivery of objects includes a closed-in-itself rail system with independently-movable holding elements (30), at least one packing and take-over station (10), at least one addressing and delivery station (11) and at least one computing unit (12). Between the packing and take-over station (10) and the addressing and delivery station (11), the rail system is designed as a storage area (2) having controllable switch points or switch point systems (5) on the input and on the outlet side (5) and with functionally parallel storage tracks (2.1, 2.2, . . . ) between the switch points or switch point systems (5). Prior to being stored, the objects (32) supplied to the installation are individualized, individually packed and taken over by one holding element (30) each. Packed objects (33) and holding elements (30) are transported to the storage area (2) together, are stored along the storage tracks (2.1, 2.2, . . . ) and, when required, are retrieved from storage. Thereupon, the packed objects (33) are marked according to their destination (e.g., addressed) and are released from the holding elements (30).

17 Claims, 2 Drawing Sheets

U.S. PATENT DOCUMENTS

| | | | | |
|---|---|---|---|---|
| 5,072,822 A | * | 12/1991 | Smith | 198/349 |
| 5,238,122 A | | 8/1993 | Hart | |
| 5,287,895 A | * | 2/1994 | Raaijmakers et al. | 139/1 R |
| 5,377,814 A | | 1/1995 | Smith et al. | |
| 5,388,703 A | * | 2/1995 | Schonenberger et al. | 209/44.1 |
| 5,395,206 A | * | 3/1995 | Cerny, Jr. | 414/807 |
| 5,664,928 A | | 9/1997 | Stauber | |
| 5,678,680 A | | 10/1997 | Wellinger | |
| 6,050,421 A | * | 4/2000 | Hansen | 209/44.1 |
| 6,116,810 A | | 9/2000 | Eberle | |
| 6,170,642 B1 | * | 1/2001 | Galan et al. | 198/678.1 |
| 6,244,188 B1 | | 6/2001 | Buechi | |

OTHER PUBLICATIONS

WO 98/03420, CONVEYOR, Publication Date: Jan. 29, 1998.

WO 00/56639, Method for Conveying Unit Loads and Conveyor System for Implementing Said Method, Publication Date Sep. 28, 2000.

WO 00/61470, Method and Device for Conveying Unit Loads, Publication Date: Oct. 19, 2000.

WO 99/54244, Processing System for Processing Piece Goods, Publication Date: Oct. 28, 1999.

* cited by examiner

METHOD AND INSTALLATION FOR STORING AND DELIVERING OBJECTS

BACKGROUND OF THE INVENTION

The invention is situated in the field of materials handling technology and concerns a method and an installation that serve for temporary storage of objects and for delivering the objects ready for dispatch.

It is known to collect objects from stores to form consignments (e.g. on the basis of corresponding orders) and to make the consignments ready for dispatch by packaging them. For this purpose, for example, elaborate storage and consignment preparation installations are utilized. Such installations comprise a large number of storage compartments with an input and an outlet each as well as facilities for storing objects through the inputs of the storage compartments and for selectively retrieving objects through the outlets of the storage compartments. The retrieval of the objects usually takes place by consignment, i.e. the objects belonging to one consignment are retrieved from the corresponding storage compartments and are collected in a container proprietary to the installation. In large installations, it is usually possible to simultaneously retrieve objects for different consignments from the storage compartments and to collect them in corresponding containers, wherein the containers are conveyed from one storage compartment outlet to the next one along predefined paths. When all objects forming part of a consignment have been retrieved from storage compartments and are collected in a container, the container is usually transported to a packing station where complete consignments are packed and made ready for dispatch. Because the consignments established in accordance with requirements (e.g., orders) in most cases comprise differing numbers of objects, and in many cases the objects also have very different sizes, the packing step is usually at least partially carried out by hand, wherein the objects of every consignment depending on the size of the consignment are packaged in one or several dispatch units and are then addressed.

Installations for preparing consignments, such as have been briefly described above, are known, for example, from the publications EP-0627371 (or U.S. Pat. No. 5,664,928) or EP-0677459 (or U.S. Pat. No. 5,678,680).

As is easily evident from the above brief description of known installations for preparing consignments, these installations are very elaborate with respect to devices and the packing step represents a great obstacle for a complete automation, this in particular when objects of different size have to be prepared for consignment.

SUMMARY OF THE INVENTION

It is an object of the invention to create a method and an installation serving for temporary storage and ready for dispatch delivery of objects. The inventive method and installation are to enable further-reaching automation and simplification with regard to devices than known installations serving the same purpose.

According to the method in accordance with the invention, supplied objects are packed ready for dispatch individually (or, if so required, in small groups), but are kept in a condition still independent of a specific destination (e.g., unaddressed). Serving as packaging are, for example, easy to handle, closable bags which, if so required, may have different sizes. The packed objects are then individually taken over by a holding element each, the holding elements being movable along a rail system independently of one another. Packed objects together with the holding elements are then transported to a storage area and are stored there. The storage area comprises rail tracks and controllable switch points connecting the rail tracks such that the holding elements can be retrieved from the storage area as and when required essentially independent of the sequence, in which they were stored. After retrieval, the packaged objects are marked according to destination (e.g., addressed), are released from the holding elements for delivery, and are transported away. The holding elements are returned in an empty condition for taking over further objects. The holding elements are never separated from the rail system during operation.

The installation in accordance with the invention comprises an essentially closed-in-itself rail system with a multitude of holding elements movable along the rail tracks of the rail system independently of one another. The device further comprises a packing and take-over station and an addressing and delivery station. The rail system leads from the packing and take-over station along at least one feeding track to at least one storage area with storage tracks and controllable switch points, from the storage area along at least one delivery track to the addressing and delivery station, and from there for the return of empty holding elements along at least one return track back to the packing and take-over station.

The packing and take-over station is equipped for individual packing of supplied objects (or if so required of small groups of objects) and for taking over packed objects by one holding element each. The addressing and delivery station is equipped for destination-specific marking (e.g., addressing) of packed objects being supplied from the storage area and for their release from the holding elements. The at least one storage area, for example, comprises a multitude of functionally parallel rail tracks onto which and from which holding elements carrying packed objects are conveyed through correspondingly controllable switch points or switch point systems. The return track may be similarly equipped for buffering empty holding elements.

Advantageously, the holding elements and the rail tracks are constructed such that the packed objects are transported in a suspended condition and such that along descending rail tracks the force of gravity suffices for driving the holding elements. In such a case it is possible to arrange the supply track and/or the delivery track to be ascending, advantageously substantially vertically and to equip it with a suitable drive for the holding elements and to arrange substantially all other rail tracks of the rail system, in particular the rail tracks of the storage area, as descending and thus to leave the transportation on these tracks to the force of gravity.

The installation in accordance with the invention further comprises at least one computing unit receiving data concerning objects to be stored and to be delivered through corresponding data lines or through an input means. From these data the computing unit generates control data for the packing and take-over station, for the switch points of the at least one storage area, and for the addressing and delivery station. The installation can be controlled solely on the basis of the data supplied from the computing unit. It is, however, also possible to equip partial zones of the installation with sensor means and to control these autonomously, for example, to equip the packed objects and/or the holding elements with suitable identification means (e.g. a visual code or an electronic memory device) and to read the identifications for local control functions using local reading devices.

The main difference between the method according to the invention and corresponding known methods consists of the fact that according to the invention there is no assembling of consignments. According to the invention, the objects do not leave the installation in the form of consignments, but as individually packed objects that are ready for dispatch (possibly small groups of objects which, however, have never been individualized). The main advantages of the method and of the installation according to the invention result from the fact, that the packing takes place at the input side and that the objects are stored being held individually. As a result of this, at least in the case in which objects of the same or of similar format (e.g., CDs) are handled, there are no packages of different formats to be made. For handling objects with very different formats, these are supplied as usual in larger batches and, therefore, the packing and take-over station can be once adapted for the whole batch. All this makes automation easier or reduces manual labor. Because the objects are stored in a held condition, they do not have to be picked up for retrieval from the store. Therefore, an accurate positioning of the stored objects necessary for such a pick-up and/or corresponding intelligent retrieval tools is not necessary. The advantages as mentioned by far outweigh the additional packing materials and increased dispatch costs, if any.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
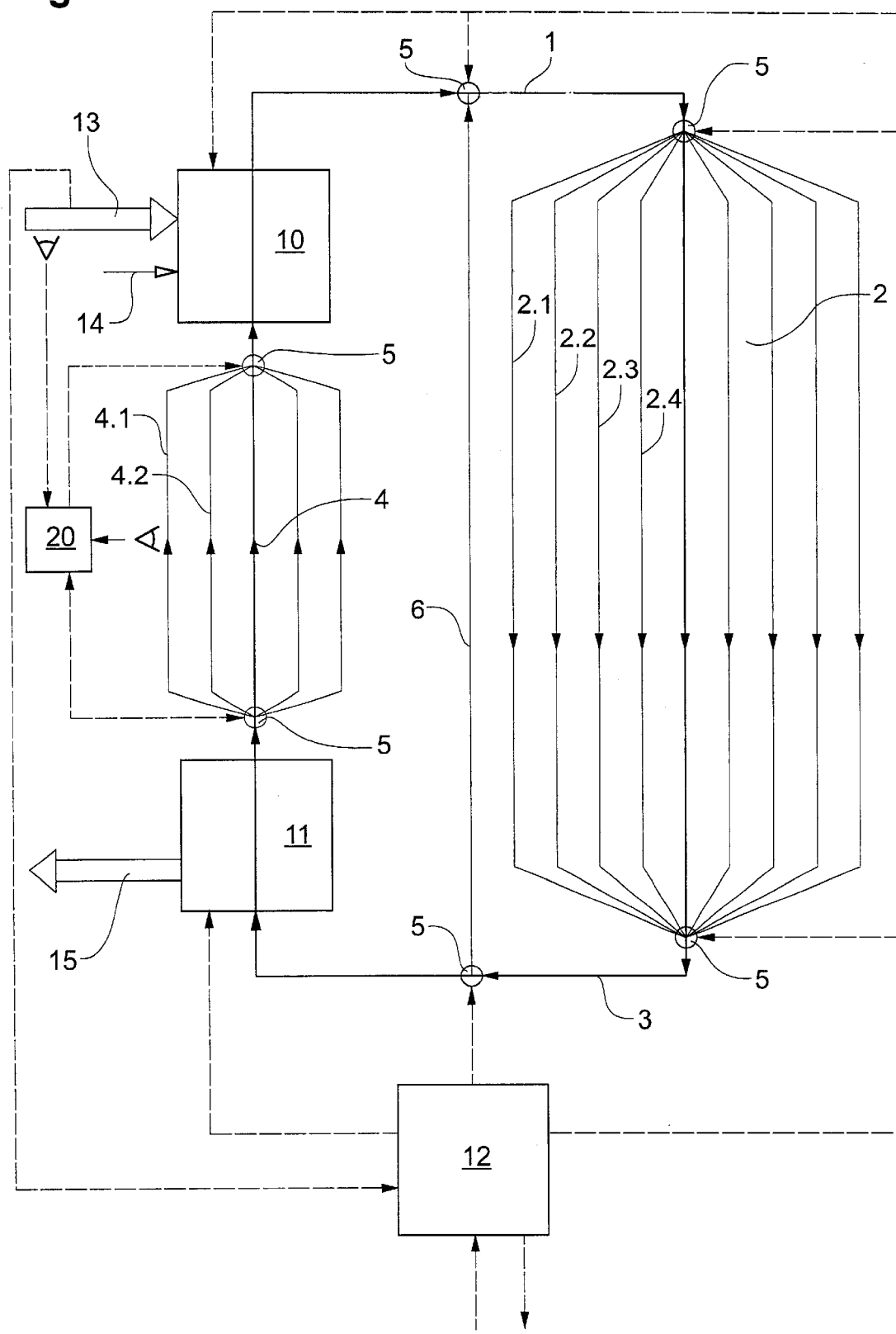
FIG. 1 shows a schematic diagram of the principle of the method and of the installation according to the invention.

FIG. 1 illustrates very schematically and on a simple example the principle of the method and the installation according to the invention. Unbroken lines designate rail tracks of the rail system (conveying direction indicated with arrows), circles designate controlled switch points or switch point systems of the rail system, broken lines designate data lines and boxes designate units with various other functions.

The rail system comprises a supply track 1, a storage area 2, a delivery track 3, and a return track 4, as well as in particular in the storage area 2 a multitude of controllable switch points or switch point systems 5 located at junctions and branches of rail tracks. The switch point functions can be implemented as multifunctional switch points (with more than two switching options) or else as systems of bifunctional switch points (switch points with only two switching options).

The storage area 2 depicted in FIG. 1 comprises a multitude of functionally parallel storage tracks 2.1, 2.2, ... and controllable switch points or switch point systems selectively connecting these storage tracks with the supply track and with the delivery track. The illustrated storage area 2 further comprises a storage return track 6, which serves for returning holding elements with packed objects from the outlet side of the storage area back to the entry side of the storage area.

The storage area 2 illustrated in FIG. 1 is an example of how a storage area of an installation in accordance with the invention may be designed, it being kept in mind that different designs are also possible.

If the installation is operated such that on each storage track of the multitude of functionally parallel storage tracks only one object type is stored, then the storage return track 6 is not needed because in such a case one object of every object type in store is always available for retrieval. However, this means that only as many object types can be handled as storage tracks are present. It is advantageous to provide storage tracks of different lengths and to store objects in lesser demand in smaller numbers on shorter tracks and objects in greater demand in greater numbers on longer storage tracks.

It is also possible to make do without functionally parallel storage tracks and to provide only one storage track and one storage return track 6 as well as two bifunctional switch points connecting the storage track with the supply track and the delivery track or closing it with the storage return track to a circle. Holding elements with packed objects stored on the storage track and, if so required, also on the storage return track are then circulated on the storage track and on the storage return track until a specific object to be retrieved enters into the zone of the switch point on the outlet side, at which time the switch point is switched over and the object is conveyed to the delivery track.

The storage area can also comprise dead-end-like rail tracks, on which holding elements with packed objects are stored in a first-in-last-out manner.

For increasing the buffering capacity for empty holding elements, functionally parallel buffer tracks 4.1, 4.2 ... can be provided in addition to the return track 4. The buffering capacity in the zone of the return track 4 may also be increased in different manners. For example, the buffering capacity may be increased by means of a spiral-shaped extension of the return track 4 or by means of a dead-end-like buffer track, which is utilized as a first-in-last-out buffering store.

The holding elements that are movable independently of one another along the rail tracks of the rail system are not shown in FIG. 1.

Rail systems with holding elements movable independently of one another as well as corresponding drives and controllable switch points, which are suitable for an installation according to the invention, are described, for example, in the following publications: WO-99/33731, WO-00/56639, WO-00/61470, WO-99/54244, EP-0936161, EP-0870934 (or U.S. Pat. No. 6,118,810), WO-98/03420 or EP-856480.

The installation further comprises a packing and take-over station 10, an addressing and delivery station 11, and a computing unit 12.

Individualized objects are supplied to the packing and take-over station 10 (arrow 13) as well as packaging material (arrow 14). The packaging material consists, for example, of suitable bags into which the objects are inserted and which are thereupon closed. The holding elements, for example, are each equipped with a gripper for gripping one closed bag. A device for gripping bags supplied on a conveyor belt with the help of grippers is described, for example, in the publication EP-0903308. It is also conceivable to pick up the empty bags with the grippers, to fill the objects into the gripped bags, to transport and to store the bags suspended with their opening facing upwards in an unclosed condition, and to close them in the addressing and delivery station. It is also possible to utilize packaging materials other than bags. In any case, all packages established in the packing and take-over station are to be transportable with essentially identical holding elements.

From the addressing and delivery station 12, ready for dispatch (packed and marked according to destination) objects (arrow 15) are transported away. The marking of the packed objects can be realized by affixing correspondingly printed labels to the packages, by directly imprinting addresses or corresponding codes on the packages or by any other suitable operation. For releasing the packed objects from the holding elements in the addressing and delivery station as well as for picking them up in the packing and take-over station, the device described in the publication EP-0903308 can be utilized.

The computing unit 12 generates control data for the control of the functional units of the installation from transmitted or inputted data. Such data concern the supplied objects and the objects to be delivered and they are transmitted to the computing unit, for example, from the zone of the packing and take-over station 10 and/or from external sources. The computing unit generates from these data control data that, on the one hand, control the input side (packing and picking-up objects with holding elements as well as switch point settings for assigning loaded holding elements to storage tracks 4.1, 4.2, . . . ) and, on the other hand, for control the outlet side (switch point settings for retrieval of loaded holding elements from the storage area 2, destination-related marking and releasing objects retrieved from the storage). If a storage return track 6 is provided, then the computing unit 12 also generates control data for switch point settings, through which loaded holding elements are transported from the outlet of the storage area 2 back to its input. This can be necessary in order to remove objects not to be delivered that block the outlets from the storage tracks 2.1, 2.2, . . . , for the delivery of other objects.

Control of a buffering arrangement for buffering empty holding elements between the addressing and delivery station 11 and the packing and take-over station 10 can be effected by the computing unit 12 or can be carried out autonomously or partially autonomously by a local control unit 20. The local control unit 20 receives data recorded by sensors concerning the fill status of the buffering tracks 4.1, 4.2, . . . and concerning the objects supplied to the packing and take-over station 10 (arrow 13) and generates from the received data the necessary control data for controlling the controllable switch points 5.

The computing unit 12 may further generate data that is exploitable for other purposes and/or can be transmitted to other computing units (e.g., data for invoicing, data for statistical evaluations and book-keeping purposes, etc.).

Figure 2:
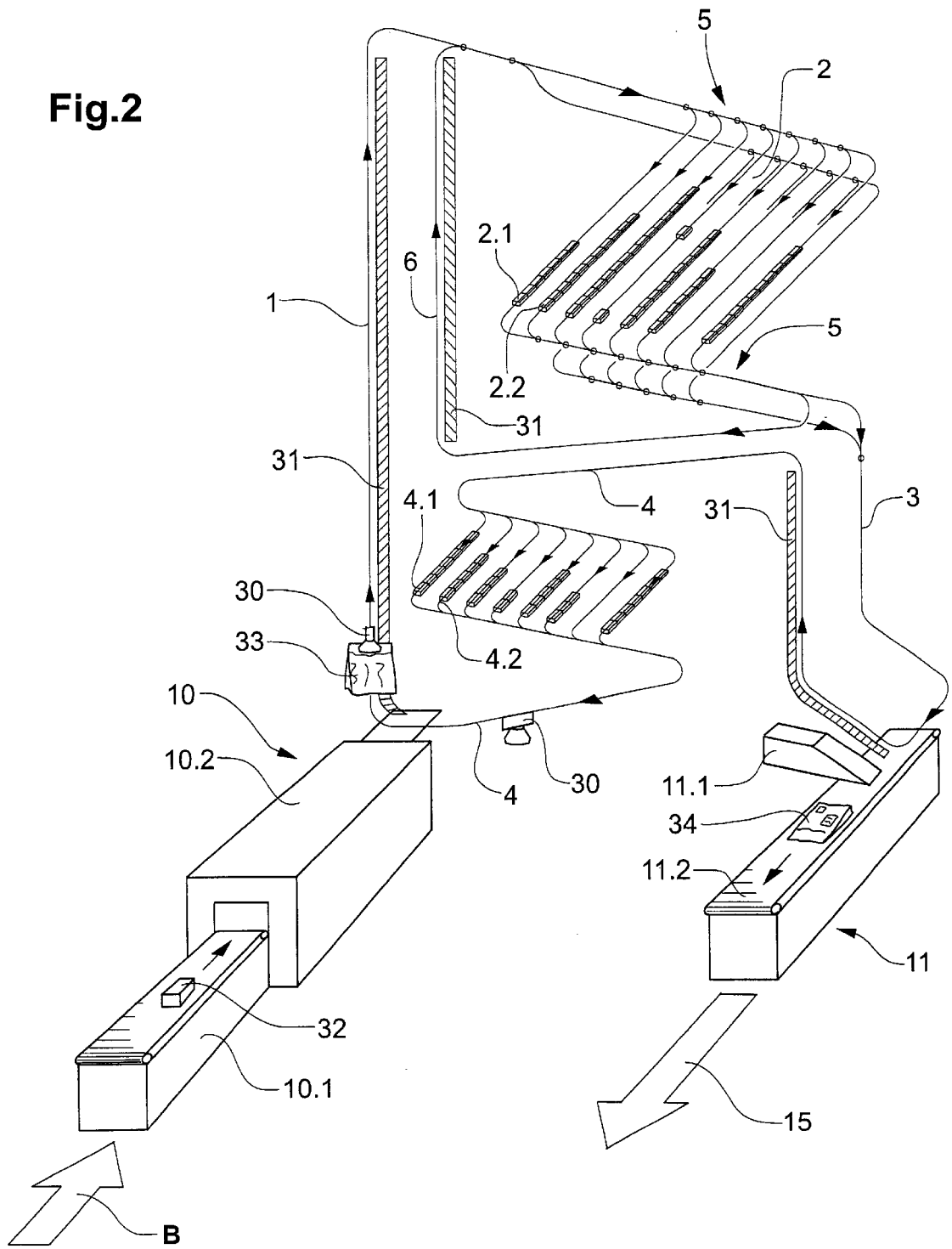
FIG. 2 shows an advantageous embodiment of the installation in accordance with the invention.

FIG. 2 shows in more detail than FIG. 1 an advantageous embodiment of the installation in accordance with the invention. This embodiment comprises the same elements as the installation depicted in FIG. 1. Therefore, the same elements are designated with the same reference numbers.

The rail system with the holding elements 30 movable along it independently of one another, for example, is based on the conveying system described in the publication WO-99/33731. The supply track 1, a first part of the delivery track 3 and a part of the storage return track 6 are oriented essentially vertically upwards and comprise corresponding drives 31. The remainder of the rail tracks, in particular the functionally parallel storage tracks 2.1, 2.2 . . . and buffering tracks 4.1, 4.2 . . . are descending in the direction of holding element movement, so that the holding elements are moved along these tracks solely by gravity.

The packing and take-over station 10 comprises a conveyor belt 10.1, on which the individualized, still unpacked objects 32 are deposited, and a packing device 10.2, in which the objects are packed in bags (packed objects 33).

The addressing and delivery station 11 comprises an addressing device 11.1 and a removal belt 11.2, on which packed and addressed objects 34 are deposited and conveyed away after release from the holding elements.

Functional units applicable in the installation according to the invention, are generally known to one skilled in the art. The teaching of the present description enables him to adapt and correspondingly combine without problems such known functional units for their application in the installation according to the invention.

What is claimed is:

1. A method for temporarily storing objects (32, 33, 34) and making them ready for dispatch delivery, the method comprising the steps of:

individually packing supplied objects (32);

taking-over a plurality of the packed objects (33) by grasping each of the packed objects (33) with a holding element (30), and moving the holding elements (30) and the packed objects (33) associated therewith along rail tracks of a rail system, each holding element being movable independently of the other holding elements (30);

temporarily storing the packed objects (33) and associated holding elements (30) in a storage area (2) of the rail system;

on demand, retrieving a plurality of the packed objects (33) with the holding elements (30) from the storage area (2); and marking the packed objects (33) retrieved from the storage area according to a destination, releasing the packed objects from the holding elements (30) and returning the holding elements (30) for a further-taking-over operation.

2. The method in accordance with claim 1, wherein the storage area comprises a multitude of functionally parallel storage tracks (2.1, 2.2, . . . ), said storage tracks being connected through switch points (5) on an input side and on an outlet side.

3. The method in accordance with claim 2, wherein objects of only one object type are stored on each of the functionally parallel storage tracks.

4. The method according to claim 2, wherein the holding elements (30) are driven by gravity at least along the storage tracks (2.1, 2.2, . . . ).

5. The method in accordance with claim 1, wherein holding elements (30) with packed objects (33) are returned to an input side of the storage area (2) from an outlet side of the storage area (2) along a storage return track (6).

6. The method according to claim 5, herein a multitude of holding elements (30) with packed objects (33) are circulated on a rail circuit formed by a storage track, the storage return track (6) and a switch point on the input side and on the outlet side (5), until a predefined one of the objects (33) reaches the switch point on the outlet side and is thus retrievable from the storage area (2).

7. The method in accordance with claim 1, wherein the objects (32) are packed in bags and the bags are picked-up by grippers of the holding elements (30) and are transported and stored essentially suspended from the holding elements (30).

8. The method in accordance with claim 1, wherein empty holding elements (30) are buffered during return transportation.

9. The method according to claim 1, wherein the method is controlled on the basis of data regarding objects supplied and regarding objects to be delivered.

10. The method in accordance, with claim 1, wherein at least parts of the method are controlled locally and autonomously on the basis of data recorded by sensors from at least one of the holding elements (30) and the packed objects (33).

11. An installation for temporarily storing objects (32, 33, 34) and making them ready for dispatch delivery, which device comprises:

at least one packing and take-over station (10), at least one addressing and delivery station (11), at least one computing unit (12), a rail system comprising: a storage area (2) with at least one storage track (2.1, 2.2, ...) and controllable switch points (5), at least one supply track (1) leading from the packing and take-over station (10) to the storage area (2), at least one delivery track (3) leading from the storage area (2) to the addressing and delivery station (11) and at least one return track (4) leading from the addressing and delivery station (11) to the packing and take-over station (10), and a plurality of holding elements movable along the rail system, and wherein the packing and take-over station (10) is equipped for packing individual objects (32) and for their take-over by the holding elements and the addressing and delivery station (11) is equipped for marking the packed objects (33) in a destination-related manner and for releasing them from the holding elements (30) and wherein the computing unit (12) is equipped for receiving data regarding supplied objects (32) and objects to be delivered (34) and for generating control data for controlling the packing and take-over station (10), the addressing and delivery station (11) and the controllable switch points (5).

12. The installation in accordance with claim 11, wherein the storage area comprises a multitude of functionally parallel storage tracks (2.1, 2.2, ...), which are selectively connected through controllable switch points (5), on the input side with the supply track (1) and on the outlet side with the delivery track (3).

13. The installation according to claim 11, wherein the storage area (2) further comprises a storage return track (6).

14. The installation in accordance with claim 11, wherein the holding elements (30) comprise grippers for picking-up packed objects (32).

15. The installation according to claim 11, wherein, of the rail tracks of the rail system, at least one of the supply track (1) and the delivery track (3) is arranged as ascending in a direction of holding element movement and is equipped with a drive (31) for driving the holding elements (30) and wherein at least the storage tracks (2.1, 2.2, ...) are arranged as being descending such that holding elements (30) are driven along these storage tracks (2.1, 2.2, ...) by gravity.

16. The installation in accordance with claim 11, wherein the controllable switch points (5) are designed as multifunctional switch points or as series of bifunctional switch points.

17. The installation according to claim 11, wherein, in addition to the return track (4), at least one buffer track (4.1, 4.2 ...) running functionally parallel to the return track is provided.

* * * * *

UNITED STATES PATENT AND TRADEMARK OFFICE
CERTIFICATE OF CORRECTION

PATENT NO.   : 6,768,929 B2
DATED        : July 27, 2004
INVENTOR(S)  : Roesch

It is certified that error appears in the above-identified patent and that said Letters Patent is hereby corrected as shown below:

Column 6,
Line 50, delete "herein" and insert -- wherein --.

Signed and Sealed this

Twenty-sixth Day of October, 2004

JON W. DUDAS
*Director of the United States Patent and Trademark Office*